Nov. 28, 1933.   C. A. RUESENBERG   1,937,070
CLUTCH
Filed July 9, 1931   2 Sheets-Sheet 1

Nov. 28, 1933.  C. A. RUESENBERG  1,937,070

CLUTCH

Filed July 9, 1931   2 Sheets—Sheet 2

Inventor:
Carl A. Ruesenberg
By Wilson, Dowell,
McCanna + Rehm
Attys.

Patented Nov. 28, 1933

1,937,070

UNITED STATES PATENT OFFICE 1,937,070

CLUTCH

Carl A. Ruesenberg, Rockford, Ill., assignor to Rockford Drilling Machine Co., Rockford, Ill., a corporation of Illinois Application July 9, 1931. Serial No. 549,593

11 Claims. (Cl. 192—68)

This invention relates to friction clutches generally, but is more particularly concerned with one especially adapted for use on motor vehicles.

The principal object of my invention is to provide a clutch, the back plate and release levers of which are made in the form of sheet metal stampings with a view to lightness and economy of construction, and in which the release levers are mounted in a novel manner permitting of quick and easy assembling, as well as easier and more accurate adjustment, and better performance.

Another object consists in the provision of novel means for guiding the pressure plate on the back plate.

The invention is illustrated in the accompanying drawings, in which—

Fig. 3 is a fragmentary sectional detail showing a modified construction, and

Similar reference numerals are applied to corresponding parts throughout the views.

Figure 1:
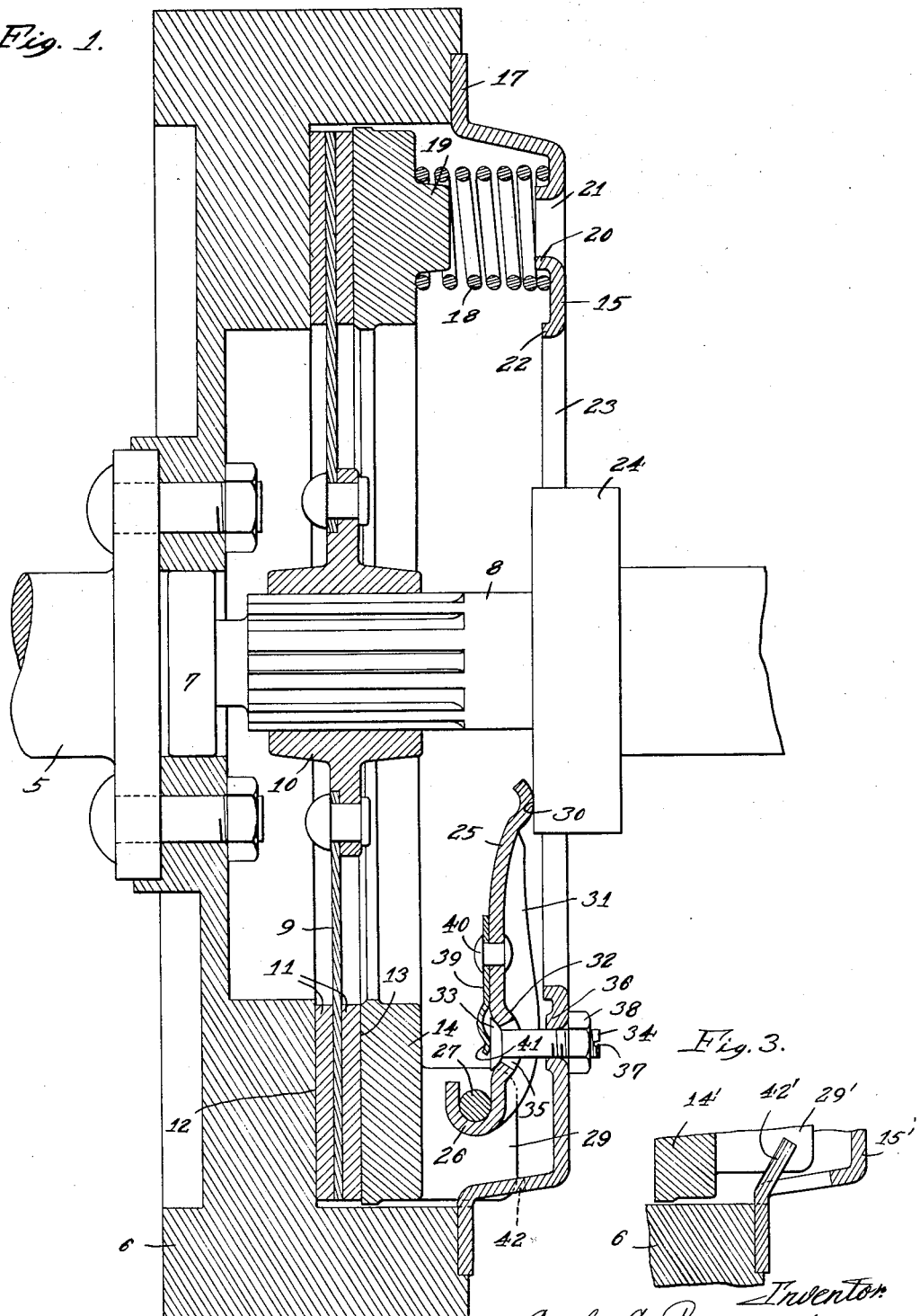
Figure 1 is a central longitudinal section in a vertical plane through a clutch embodying my invention.

Referring to Figure 1, the end of the engine crank shaft appears at 5, having the flywheel 6 mounted thereon in the usual way and serving as a housing for the clutch. A pilot bearing 7 at the end of the crank shaft receives the front end of the driven shaft 8, which extends rearwardly from the flywheel and clutch into the gear box of the transmission in the usual way. The clutch disc 9 has its center hub 10 splined on the shaft 8, and pads or facings 11 are fastened on opposite sides of the marginal portion for engagement on one side with the driving face 12 provided on the back of the flywheel, and on the other side with the driving face 13 provided on the front of the pressure plate 14. 15 is the back plate arranged to be fastened to the rim of the flywheel suitably by means of bolts passed through holes 16 in the flanged rim 17 of the back plate. The back plate is stamped from a piece of sheet metal to the dished cross-section shown in Figure 1, so as to provide enough space between the pressure plate and back plate for a series of coiled compression springs 18, which fit at one end over bosses 19 cast integral with the pressure plate, and at the other end over circular flanges 20 defining the holes 21 punched in the back plate. An annular flange 22 is formed on the back plate 15 defining the center hole 23 through which the throw-out collar 24 has access to the release levers 25. The collar 24 is, of course, given movement by depression of a clutch pedal in the usual way. The arrangement thus far generally described is, of course, well known. My invention is concerned with novel details of construction and arrangement as hereinafter fully described.

The release levers 25, in accordance with my invention, are each stamped from a single piece of sheet metal. A hook 26 is formed on the outer end to provide for the pivotal attachment of each lever on a cross pin 27 received in a pair of lugs 28—29 projecting rearwardly from and suitably cast integral with the pressure plate 14. The pin 27 has a head on one end and receives a cotter pin through its other end to hold the same in place. A curved portion 30 is formed on the inner end of each lever for abutment with the flat front face of the throw-out collar 24. Longitudinal flanges 31 are formed on the edges of each lever reaching from end to end and serving to lend the desired degree of stiffness, and prevent bending under strain. A shallow socket 32 is formed in each lever near the hooked outer end midway between the flanges 31. These sockets open on the front face of the levers and receive the headed ends 33 of screws 34 extended rearwardly through slots 35 punched in the levers diametrically of the sockets 32. The back plate 15 has holes punched therein so as to extrude the metal, as indicated at 36 in Figure 1, and these holes are tapped to receive the screws 34. The extruded metal naturally provides the desired elongation of the bearing for the screw and eliminates likelihood of the screw being wobbly. The screws are threaded through the back plate from the inside by the entry of a screw-driver in the slots 37 provided in the threaded ends of the screws. Lock nuts 38 thread on the projecting ends of the screws 34 and jam against the back plate to hold the screws in adjusted condition. A flat leaf spring 39, suitably secured on the front face of each release lever as by means of a rivet 40, has a bent end 41 bearing like a finger on the head 33 diametrically thereof, whereby to hold the lever against any possibility of displacement from its operative relation to the screw while still allowing the lever to oscillate freely with respect to the headed end of the screw in the engagement and disengagement of the clutch. While the part 39 is referred to as a leaf spring, it is evident that its function is simply that of a retaining plate, and there need be no springiness so long as the end 41 has line contact diametrically of the headed end of the screw, because in that case there is no deflection of the end of the retaining member. It should be evident from this description that I have provided release levers of extremely simple and economical construction, and means in the nature of posts for rigidly mounting the levers on the back plate with freedom to oscillate with respect thereto and also to be accurately adjusted thereby. The rigidity of the mounting is assured by reason of the fact that each screw threads directly in the back plate in the extruded portion 36 thereof, and is furthermore fastened by means of the lock nut threading on the projecting end of the screw and jammed against the back plate. There can be no play in the screw itself, and any chance for play in the mounting of the lever on the screw is definitely eliminated by the construction described. The construction, in other words, is designed with a view to eliminating faults such as are otherwise bound to show up when the centrifugal force incidental to the high speed rotation of the flywheel becomes a factor. As regards adjustment, the facility for this is apparent, because all that it is necessary to do is loosen the lock nut, turn the screw the desired amount, and then retighten the nut. Very accurate adjustment can be made by virtue of the construction and in much less time than is required in other clutches constructed along different lines, many of which involve the adjustment of a nut and the consequent necessity for removing and replacing a cotter pin, the use of which has the further objection that it does not permit such fine adjustment.

Figure 2:
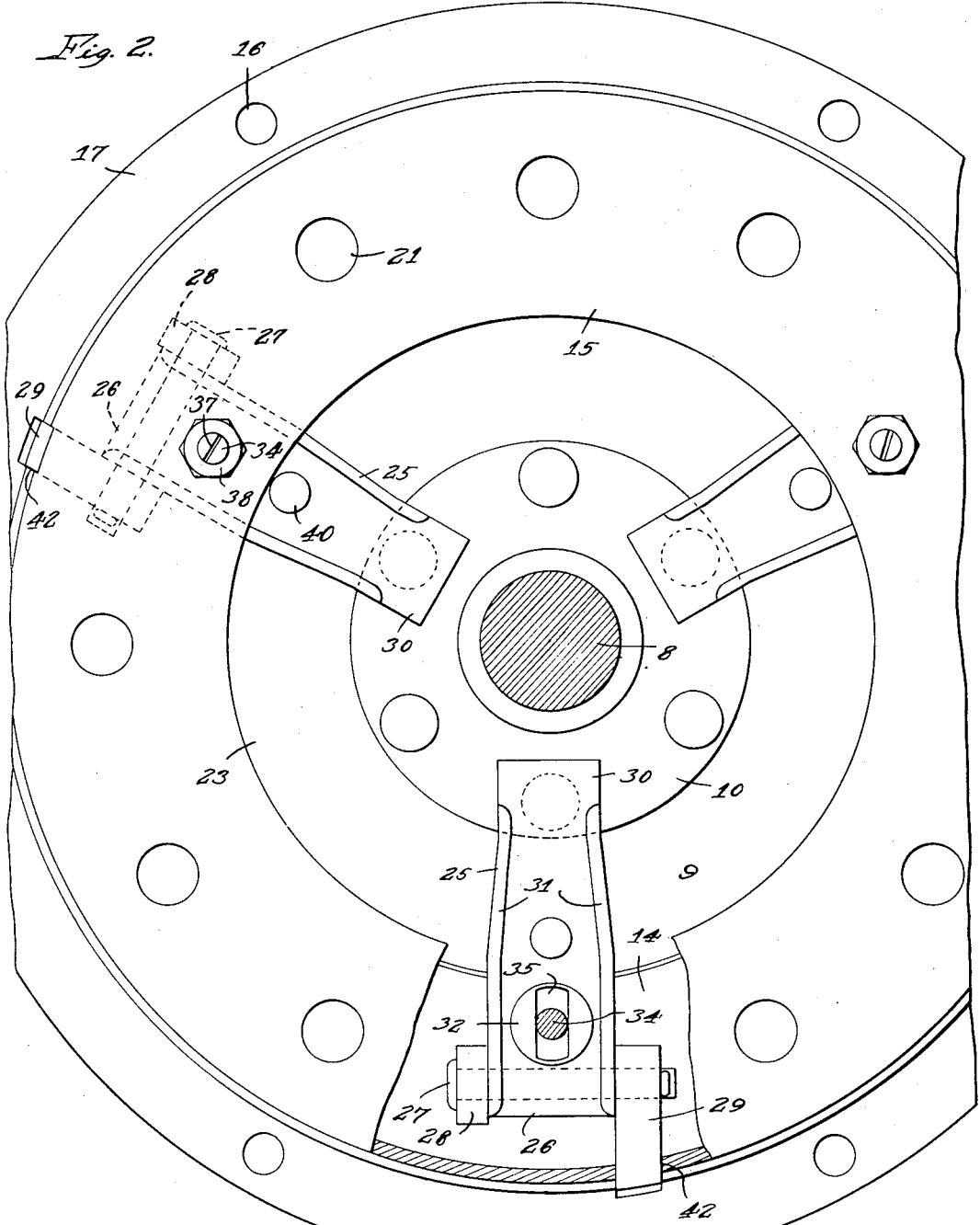
Fig. 2 is a rear view with certain portions broken away to conserve space, and other portions shown in section for purposes of better illustration.
Figure 4:
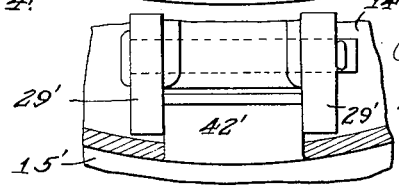
Fig. 4 is a section at right angles to Fig. 3.

In Figs. 1 and 2 I have shown slots 42 punched in the back plate in alignment with the lugs 26 on the pressure plate, the latter being extended outwardly far enough to project into these slots, as shown, and having a close working fit therein, whereby to interlock the pressure plate with the back plate to turn with the flywheel, and still allow the pressure plate to move toward and away from the back plate in the disengagement and engagement of the clutch. Substantially the same results are obtainable, as shown in Figs. 3 and 4, by providing lugs 29' on the back plate 14' between which a lug 42', struck inwardly from the back plate 15', is arranged to be entered, thereby interlocking the pressure plate with the back plate to turn with the flywheel. In either case, it will be seen that this relieves the release levers 25 of any torque strains, and accordingly makes for easier operation of the clutch.

It is believed the foregoing description conveys a good understanding of the objects and advantages of my invention. The appended claims have been drawn with a view to covering all legitimate modifications and adaptations.

I claim:

1. In a friction clutch comprising a driving element, a driven element, a pressure plate, and spring means cooperating with the pressure plate for normally urging it toward the driving element to engage the driven element therebetween, a back plate on the driving element, screws threaded directly through the back plate from the inside thereof and provided with heads on the inner ends, release levers loosely mounted on the headed ends of said screws, the same having sockets therein receiving the heads of said screws, leaf springs on the levers yieldingly engaging the heads to hold the heads engaged in the sockets so as to permit the heads to turn in the sockets, said screws being arranged to be turned at their threaded ends to adjust the same directly with respect to the back plate, means providing an operating connection between the outer ends of said levers and the pressure plate, and means arranged to cooperate with the inner ends of said levers to oscillate the levers with respect to the screws.

2. In a friction clutch comprising a driving element, a driven element, a pressure plate, and spring means cooperating with the pressure plate for normally urging it toward the driving element to engage the driven element therebetween, a back plate on the driving element, screws threaded directly through the back plate from the inside thereof and provided with heads on the inner ends, release levers loosely mounted on the headed ends of said screws, the same having sockets therein receiving the heads of said screws, means provided directly on the levers for holding the heads engaged in the sockets but permitting the heads to turn with respect to the sockets to permit turning of the screws, said screws being arranged to be turned at their threaded ends to adjust the same directly with respect to the back plate, means providing an operating connection between the outer ends of said levers and the pressure plate, and means arranged to cooperate with the inner ends of said levers to oscillate the levers with respect to the screws.

3. A friction clutch as set forth in claim 2, wherein the back plate is stamped from sheet metal and is pierced to provide holes therein for extension therethrough of the screws, the metal being formed at the holes to provide elongated bearings for the screws for more rigid mounting of the screws with respect to the back plate, the said holes being threaded for threaded reception of the screws.

4. In a friction clutch comprising a driving element, a driven element, a pressure plate, and spring means cooperating with the pressure plate for normally urging it toward the driving element to engage the driven element therebetween, a back plate on the driving element, screws threaded directly through the back plate from the inside thereof and provided with heads on the inner ends, release levers loosely mounted on the headed ends of said screws, the same having sockets therein receiving the heads of said screws, means for holding the heads engaged in the sockets but permitting the heads to turn with respect to the sockets to permit turning of the screws, said screws being arranged to be turned at their threaded ends to adjust the same directly with respect to the back plate, a pair of lugs associated with each lever and projecting rearwardly from the pressure plate, the outer end of the levers being extended between said lugs, a cross pin on said lugs having the outer end of the levers pivoted thereon for pivotal connection with the pressure plate, and means arranged to cooperate with the inner ends of said levers to oscillate the levers with respect to the screws.

5. A clutch as set forth in claim 4 wherein the means for holding the heads engaged in the sockets is provided directly on the levers.

6. A clutch as set forth in claim 4, wherein the back plate is formed of sheet metal and is pierced to provide holes therein for reception of the screws, the metal of the back plate being formed at said holes to provide elongated bearings for the screws for more rigid mounting of the screws with respect to the back plate, the said holes being threaded for threaded reception of the screws.

7. A clutch as set forth in claim 4, wherein the back plate is formed of sheet metal and has a lug struck therefrom and slidably received between the lugs on the pressure plate, whereby to interlock the pressure plate with the back plate so as to turn with the driving element, the said lug permitting freedom of movement for the pressure plate toward and away from the driving element for the engagement and disengagement of the clutch, the said back plate being further pierced to provide holes therein for reception of the screws, the metal of the back plate being formed at said holes to provide elongated bearings for the screws for more rigid mounting of the screws with respect to the back plate, the said holes being threaded for threaded reception of the screws.

8. A clutch as set forth in claim 4, wherein the back plate is formed from a piece of sheet metal, the same being struck to provide a guide portion slidably engaging at least one of the lugs on the pressure plate to interlock the pressure plate with the back plate to turn with the driving element, the pressure plate having freedom for movement toward and away from the driving element for the engagement and disengagement of the clutch, the said back plate being further pierced to provide holes therein for reception of the screws, the metal of the back plate being formed at said holes to provide elongated bearings for the screws for more rigid mounting of the screws with respect to the back plate, the said holes being threaded for threaded reception of the screws.

9. In a friction clutch comprising a driving element, a driven element, a pressure plate, and spring means cooperating with the pressure plate for normally urging it toward the driving element to engage the driven element therebetween, a back plate on the driving element, screws threaded directly through the back plate from the inside thereof and provided with heads on the inner ends, release levers loosely mounted on the headed ends of said screws, the same having sockets therein receiving the heads of said screws, means for holding the heads engaged in the sockets but permitting the heads to turn with respect to the sockets to permit turning of the screws, said screws being arranged to be turned at their threaded ends to adjust the same directly with respect to the back plate, a pair of lugs associated with each lever and projecting rearwardly from the pressure plate, a cross pin on each pair of lugs, the outer end of each lever being made hook-shaped to hook over said pins between said lugs to provide a sliding pivotal connection therebetween for operation of the pressure plate by the levers, and means arranged to cooperate with the inner ends of said levers to oscillate the same with respect to the screws.

10. In a friction clutch, the combination with a back plate and a pressure plate, the pressure plate being normally urged to move away from the back plate, of screws threaded directly through the back plate from the inside thereof provided with heads on the inner ends, release levers loosely mounted on the headed ends of said screws, the same having sockets therein receiving the heads of said screws, means provided directly on said levers for engagement with the heads for holding the heads engaged in the sockets but permitting the heads to turn so as to permit turning of the screws, said screws being arranged to be turned at their threaded ends to adjust the same directly with respect to the back plate, means providing an operating connection between the outer ends of said levers and the pressure plate, and means arranged to cooperate with the inner ends of said levers to oscillate the same with respect to the screws.

11. In a friction clutch, the combination with a back plate and a pressure plate, the pressure plate being normally urged to move away from the back plate, of screws threaded directly through the back plate from the inside thereof provided with heads on the inner ends, release levers loosely mounted on the headed ends of said screws, the same having sockets therein receiving the heads of said screws, means for holding the heads engaged in the sockets but permitting the heads to turn so as to permit turning of the screws, said screws being arranged to be turned at their threaded ends to adjust the same directly with respect to the back plate, means providing an operating connection between the outer ends of said levers and the pressure plate comprising a pair of lugs for each lever projecting rearwardly from the pressure plate, and a cross-pin on each pair of lugs, the outer end of each lever being made hook-shaped to hook over said pins between said lugs to provide a sliding pivotal connection therebetween for operation of the pressure plate by the levers, and means arranged to cooperate with the inner ends of said levers to oscillate the same with respect to the screws.

CARL A. RUESENBERG.